(12) United States Patent
Herzog et al.

(10) Patent No.: US 11,458,543 B2
(45) Date of Patent: Oct. 4, 2022

(54) POWDER MODULE FOR AN APPARATUS FOR ADDITIVE MANUFACTURING OF THREE-DIMENSIONAL OBJECT

(71) Applicant: Concept Laser GmbH, Lichtenfels (DE)

(72) Inventors: Frank Herzog, Lichtenfels (DE); Frank Schödel, Kronach (DE); Florian Bechmann, Lichtenfels (DE)

(73) Assignee: CONCEPT LASER GMBH, Lichtenfels (DE)

( * ) Notice: Subject to any disclaimer, the term of this patent is extended or adjusted under 35 U.S.C. 154(b) by 70 days.

(21) Appl. No.: 17/078,358

(22) Filed: Oct. 23, 2020

(65) Prior Publication Data

US 2021/0046547 A1    Feb. 18, 2021

Related U.S. Application Data

(62) Division of application No. 15/663,703, filed on Jul. 28, 2017, now Pat. No. 10,821,515.

(30) Foreign Application Priority Data

Jul. 29, 2016  (DE) .......................... 102016114058.9

(51) Int. Cl.
*B29C 64/357* (2017.01)
*B22F 12/00* (2021.01)
(Continued)

(52) U.S. Cl.
CPC .............. *B22F 12/00* (2021.01); *B22F 10/00* (2021.01); *B29C 64/245* (2017.08); *B29C 64/25* (2017.08);
(Continued)

(58) Field of Classification Search
CPC .............................. B29C 64/35; B29C 64/357
See application file for complete search history.

(56) References Cited

U.S. PATENT DOCUMENTS

| 2001/0045678 A1 | 11/2001 | Kubo et al. |
| 2002/0090410 A1 | 7/2002 | Shigeaki et al. |

(Continued)

FOREIGN PATENT DOCUMENTS

| DE | 10158169 B4 | 2/2007 |
| DE | 102010006939 A1 | 8/2011 |

(Continued)

OTHER PUBLICATIONS

European Search Report Corresponding to EP17172781 dated Dec. 12, 2017.

(Continued)

*Primary Examiner* — Timothy Kennedy
(74) *Attorney, Agent, or Firm* — Dority & Manning, P.A.

(57) ABSTRACT

A powder module for an apparatus for additive manufacturing of three-dimensional objects, comprising a powder chamber limiting a powder room that can be filled with powdered construction material and a carrying device arranged in the powder room and limiting the powder room at the bottom, wherein between at least one powder chamber wall limiting the powder room and the carrying device a gap extending at least partially along the powder chamber wall limiting the powder room is formed, through which powdered construction material from the powder room can enter a powder module section lying below the carrying device, wherein the gap opens out into a receiving section of a receiving element arranged or formed on the powder chamber, wherein the receiving section is formed as or comprises (Continued)

Figure 1:
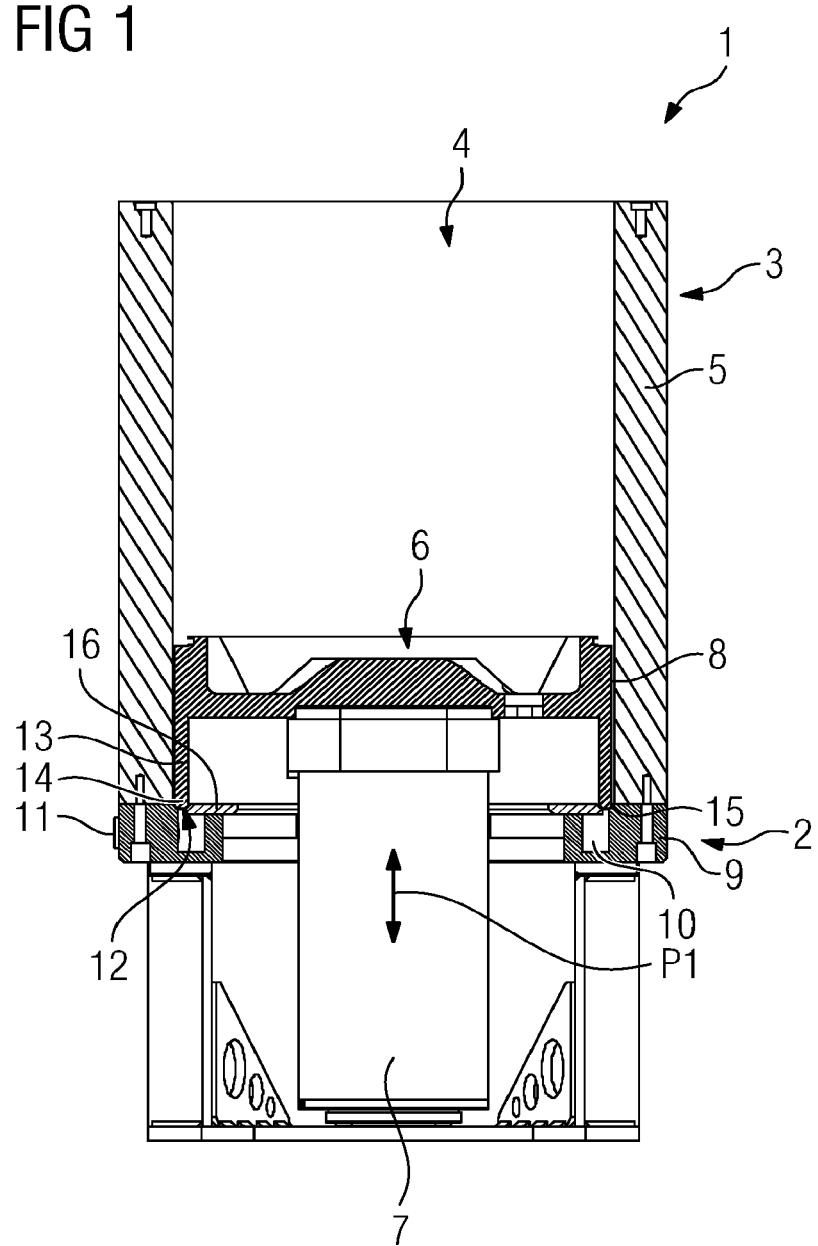

an especially ring-shaped circumferential flow channel structure provided for receiving construction material from the gap.

19 Claims, 3 Drawing Sheets

(51) Int. Cl.
| | | |
|---|---|---|
| *B29C 64/245* | (2017.01) | |
| *B29C 64/25* | (2017.01) | |
| *B22F 10/00* | (2021.01) | |
| *B33Y 30/00* | (2015.01) | |
| *B29C 64/35* | (2017.01) | |
| *B29C 64/165* | (2017.01) | |
| *B29C 64/153* | (2017.01) | |
| *B29C 64/307* | (2017.01) | |
| *B29C 64/255* | (2017.01) | |
| *B22F 10/10* | (2021.01) | |

(52) U.S. Cl.
CPC ............... *B33Y 30/00* (2014.12); *B22F 10/10* (2021.01); *B29C 64/153* (2017.08); *B29C 64/165* (2017.08); *B29C 64/255* (2017.08); *B29C 64/307* (2017.08); *B29C 64/35* (2017.08); *B29C 64/357* (2017.08)

(56) References Cited

U.S. PATENT DOCUMENTS

| | | |
|---|---|---|
| 2004/0084814 A1 | 5/2004 | Boyd et al. |
| 2005/0116391 A1 | 6/2005 | Lindemann et al. |
| 2007/0026145 A1 | 2/2007 | Lindemann et al. |
| 2013/0052291 A1* | 2/2013 | Morikawa ............... B29C 64/35 425/135 |
| 2013/0241095 A1* | 9/2013 | Korten .................. B29C 64/357 264/16 |
| 2015/0202687 A1 | 7/2015 | Pialot et al. |
| 2015/0258744 A1* | 9/2015 | Muller .................. B33Y 10/00 264/37.29 |
| 2016/0067781 A1* | 3/2016 | Kawada .................. B22F 10/20 425/78 |

FOREIGN PATENT DOCUMENTS

| | | |
|---|---|---|
| JP | 2002/205338 A | 7/2002 |
| JP | 2002/205339 A | 7/2002 |
| JP | 2005/089863 A | 4/2005 |
| JP | 2008/106319 A | 5/2008 |

OTHER PUBLICATIONS

Japanese Search Report Corresponding to JP2017124408 dated Oct. 30, 2018.

* cited by examiner

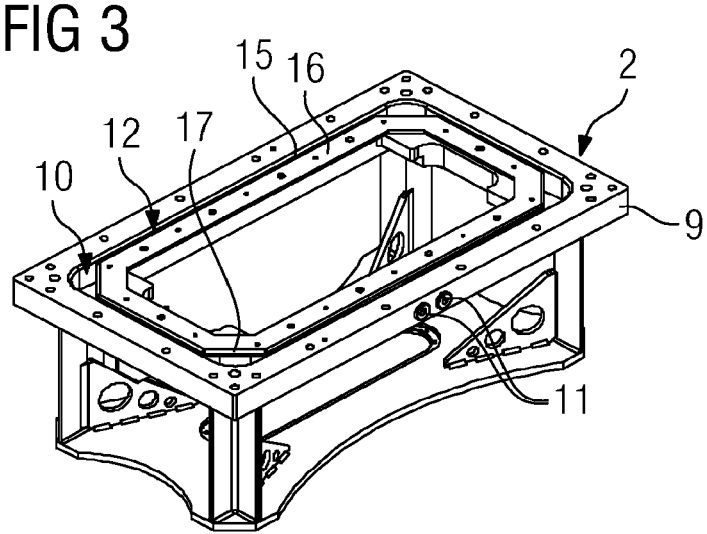

POWDER MODULE FOR AN APPARATUS FOR ADDITIVE MANUFACTURING OF THREE-DIMENSIONAL OBJECT

CROSS-REFERENCE TO RELATED APPLICATIONS

This application is a divisional of U.S. patent application Ser. No. 15/663,703 filed Jul. 28, 2017, which claims priority to German Patent Application No. 102016114058.9 filed Jul. 29, 2016. The contents of these applications are incorporated herein by reference in their entirety as if set forth verbatim.

The invention relates to a powder module for an apparatus for additive manufacturing of three-dimensional objects, which comprises a powder chamber limiting a powder room that can be filled with powdered construction material and a carrying device arranged in the powder room limiting the powder room at the bottom, comprising the other features described herein.

Such powder modules, for example in the form of construction or metering modules, are known as functional components of apparatuses for additive manufacturing of three-dimensional objects. In appropriate powder modules a gap extending along the powder chamber wall limiting the powder room is formed related to construction between the powder chamber walls limiting the powder room and the carrying device which typically is a powder chamber plate or a powder chamber table having stored thereon such a plate, through said gap powdered construction material from the powder room can enter a powder module section lying below the carrying device.

The powdered construction material that entered into the section below the carrying device is usually received or collected in a receiving container and removed therefrom by means of a flow generation device. Due to the given structural design of the receiving containers, very high flow capacities are required to realize the flow rates necessary for the removal of powdered construction material from the receiving containers.

The invention is based on the object of providing, in contrast to the above, especially in terms of a more efficient removal of construction material, an improved powder module for an apparatus for additive manufacturing of three-dimensional objects.

The object is solved by a powder module for an apparatus for additive manufacturing of three-dimensional objects as provided herein. The dependent claims relate to possible embodiments of the powder module.

The powder module described herein represents a functional component of an apparatus for additive manufacturing of three-dimensional objects. A respective apparatus is provided for the additive manufacturing of at least one three-dimensional object (hereinafter, in short, referred to as "object") by successive, selective layer-by-layer exposure and thus solidification of individual construction material layers of a powdered construction material (hereinafter, in short, referred to as "construction material") that can be solidified by means of at least one energy beam. The construction material can be metal powder, plastic powder and/or ceramic powder. Metal powders, plastic powders or ceramic powders can also be interpreted to include a powder mixture of different metals, plastics or ceramics. The energy beam can be a laser beam. The apparatus can correspondingly be an apparatus for performing selective laser melting methods (SLM methods in short) or selective laser sintering methods (SLS methods in short), i.e. a selective laser melting apparatus (SLM apparatus) or a selective laser sintering apparatus (SLS apparatus).

The powder module can generally be any powder module, which is provided for receiving and/or dispensing construction material. In particular, the powder module can be a construction module in which the actual additive construction of three-dimensional objects is performed and which, for this purpose, is filled with construction material to be solidified in a successive, selective layer-by-layer manner when performing additive manufacturing processes, a metering module via which when performing additive manufacturing processes construction material is metered out into a process chamber successively and in layers, or a collector module which when performing additive manufacturing processes is filled with construction material that is not solidified.

The powder module comprises a powder chamber. The powder chamber limits a powder room that can be filled with construction material. Specifically, the powder room is limited at least on the side by walls of the powder chamber (powder chamber walls) of the powder chamber generally formed like a hollow parallelepiped or like a hollow cylinder. At the bottom, the powder room is limited by a carrying device. The carrying device can be a powder chamber plate or a powder chamber table having stored thereon such a plate. The carrying device is typically movably supported between two end positions, i.e. between an upper end position (related to the height of the powder module) and a lower end position, relative to the powder chamber; the movable support of the carrying device is typically realized by an especially (electro) motor operated drive or actuator device coupled with the carrying device.

Between at least one powder chamber wall, limiting the powder room, and the carrying device a gap is formed extending at least partially along the powder chamber wall limiting the powder room and especially surrounding the carrying device in a ring-shaped circumferential manner. Through the gap, construction material from the powder room enters into a powder module section lying below the carrying device. The gap given for structural design reasons represents a "leakage section" via which construction material from the powder room can enter a powder module section lying below the carrying device despite possible existing sealing elements.

In the powder module described herein the gap opens out, especially directly, into a receiving section of the receiving element arranged or formed on the powder chamber; thus the gap turns into, especially directly, the receiving section of the receiving element arranged or formed on the powder chamber. In other words, the gap aligns with the receiving section of the receiving element. The receiving section is formed as or comprises an especially ring-shaped circumferential, self-contained flow channel structure provided for receiving construction material from the gap. In the flow channel structure a closed flow fluid cycle can develop. The flow channel structure is, in terms of a preferably optimum ability to flow through, fluidically designed with a flow fluid, typically a gas, e.g. air. The structural design of the flow channel structure is especially selected such that comparatively low flow capacities are required to realize the flow rates necessary for removing construction material from the receiving section. The structural design of the flow channel structure is especially selected such that in said structure a (widely) laminar flow can be formed; the flow channel structure typically has no section which enables an undesired swirl of a flow fluid flowing through said structure.

To enter the flow fluid into the flow channel structure the receiving element typically comprises at least one connecting element for connecting a flow generation device, which is provided for generating a fluid flow (cleaning flow), flowing through the flow channel structure to remove construction material located in the flow channel structure from the flow channel structure. Of course, the receiving element can comprise several connecting elements, wherein a first connecting element can serve for feeding the flow fluid into the flow channel structure, and another connecting element can serve for deducing the flow fluid loaded with construction material from the flow channel structure. The fluid flow can especially be a suction flow or blower flow; the flow fluid can accordingly flow as suction flow or blower flow. Accordingly, the flow generation device can be a suction device or a blower device.

To purposefully affect the ability to flow through or the flow properties of the flow channel structure, said structure can comprise at least one flow affecting flow element. In the simplest case, a respective flow element can be formed by a purposeful change of the cross-section geometry of the flow channel structure. For example, by a purposeful change of the cross-section geometry an increase or decrease of the flow rate of the flow fluid flowing through the flow channel structure can be realized (according to the Venturi effect).

The flow channel structure typically has a cross-section geometry that is open on one side, e.g. U-type, V-type or C-type. Specifically, the flow channel structure can be a groove channel-shaped recess in the receiving element or the receiving section. The flow channel structure is typically open at the top; the aperture (opening aperture) of the flow channel structure typically faces the powder room limited by the powder chamber.

It was mentioned that the flow channel structure is especially formed in a ring-shaped circumferential way. This is intended to mean that the flow channel structure is formed (significantly) extending e. g. along the dimensions, especially the outer dimensions or inner dimensions, of the carrying device or of the powder chamber wall or a section in between.

The flow channel structure is typically arranged or formed below the carrying device.

The powder module can comprise a guide element at least partially limiting the gap. The guide element is typically arranged or formed opposite the powder chamber wall limiting the gap. The guide element typically extends in parallel to the powder chamber wall opposite thereof. The geometry of the guide element is adjusted to the geometry of the powder chamber such that the gap is at least partially formed between the guide element and the powder chamber wall limiting the powder room.

The guide element can be movably supported between a closing position and an opening position and vice versa, relative to the flow channel structure or the receiving element. In the closing position, the guide element, i.e. especially a closing section of the guide element facing the opening aperture of the flow channel structure, is moved relatively to the flow channel structure, i.e. especially toward the opening aperture of the flow channel structure, such that an intrusion of construction material into the flow channel structure is impossible. Therefore, in the closing position it is not possible for construction material from the gap to enter the receiving section of the receiving element, or the flow channel structure. In the open position the guide element, i.e. especially a closing portion of the guide element facing the opening aperture of the flow channel structure, is moved relatively to the flow channel structure, i.e. especially away from the opening aperture of the flow channel structure, such that an intrusion of construction material into the flow channel structure is possible. Therefore, in the open position it is possible for construction material from the gap to enter the receiving section of the receiving element, or the flow channel structure.

The movable support of the guide element can for example be realized by an especially (electro) motor operated drive or actuator device associated with the guide element.

A movable support of the guide element can, however, also be realized by a coupling for movement of the guide element with the carrying device. The coupling for movement of the guide element with the carrying device can, for example, be realized by integrally forming the guide element and the carrying device. The guide element can, for example, form a prism-like or cylindrical extension of the carrying device. Alternatively to the integral forming, the guide element can also be formed as a separate, especially prism-like or cylindrical component that can be attached or that is attached to the carrying device.

It was mentioned that the carrying device is typically movably supported between two end positions, i.e. between an upper end position (related to the height of the powder module) and a lower end position, relative to the powder chamber. In the case of a coupling for movement of the guide element with the carrying device the closing position of the guide element typically corresponds to the lower end position of the carrying device. Consequently, the guide element is moved into the closing position, if the carrying device is moved into the lower end position.

As mentioned, the flow channel structure can have an opening aperture facing the gap. The receiving element or the receiving section can, in the area of at least one edge portion limiting the opening aperture of the flow channel structure, be formed with at least one surface section that is formed (angularly) inclined or curved (in a concave or convex manner). The design of an edge portion limiting the opening aperture provided with a surface section formed inclined or curved is practical, as it ensures that no construction material can accumulate outside the flow channel structure between the gap and the flow channel structure. With the inclined or curved design of the edge portion, the construction material is "forced" to enter into the flow channel structure according to the principle of a funnel.

The guide element, if present, can, especially in the section of a free end, be formed with a surface section diametrically opposed (inclined or curved) to the surface section of the receiving element of the edge portion. In such a manner, especially in the closing position of the guide element, an (improved) sealing of the flow channel structure can be realized which ensures an efficient through-flow of the flow channel structure by the flow fluid, i.e. especially prevents undesired leaking of flow fluid, possibly loaded with construction material, from the flow channel structure.

In order to reduce the size (inner span) of the opening aperture of the flow channel structure, the powder module can comprise a cover element that can be or is attached (in the assembly state of the powder module) to the receiving element and minimizes the opening aperture. The cover element can—analogous to the edge portion of the receiving element limiting the opening aperture of the flow channel structure—in the area of at least one edge portion limiting the opening aperture of the flow channel structure be formed with at least one surface section that is formed (angularly) inclined or curved (in a concave or convex manner). The design of an edge portion of a respective cover element, limiting the opening aperture, provided with a surface section formed inclined or curved is practical, as it also ensures that no construction material can accumulate outside the flow channel structure between the gap and the flow channel structure. With the inclined or curved design of the edge portion, the construction material is "forced" to enter into the flow channel structure according to the principle of a funnel.

If present, the guide element, especially in the area of a free end, can, possibly additionally, be formed with a surface section formed diametrically opposed to a surface section of the edge portion of the cover element. In such a manner an (improved) sealing of the flow channel structure can be realized, especially in the closing position of the guide element, which ensures an efficient through-flow of the flow channel structure by the flow fluid, i.e. especially prevents undesired leaking of flow fluid, possibly loaded with construction material, from the flow channel structure.

In addition to the powder module, the invention also relates to an apparatus for additive manufacturing of three-dimensional objects. The apparatus, which especially is an SLS apparatus or an SLM apparatus is characterized in that it comprises at least one powder module as described. All embodiments in connection with the powder module thus analogously apply to the apparatus.

Figure 2:
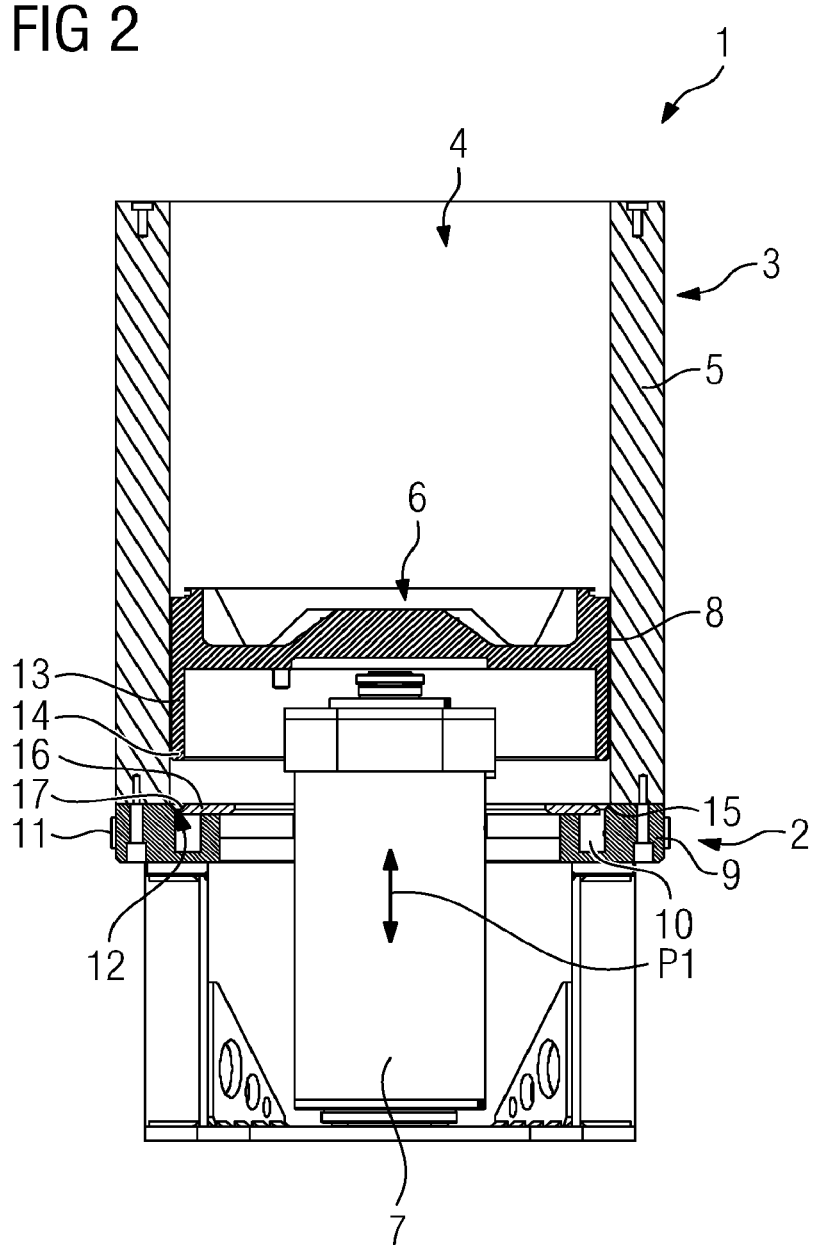

The invention is explained in more detail by means of exemplary embodiments in the figures of the drawings. In which:

FIG. 1, 2 each show a schematic diagram of a powder module according to an exemplary embodiment; and FIG. 3 shows a schematic diagram of a receiving element of the powder module shown in FIGS. 1, 2.

FIGS. 1-2 each show a schematic diagram of a powder module 1 according to an exemplary embodiment. The powder module 1 is respectively shown in FIGS. 1, 2 in a (longitudinal) sectional view. FIG. 3 shows a schematic diagram of a receiving element 2 of the powder module 1 shown in FIGS. 1, 2 in a separate perspective view.

The powder module 1 represents a functional component of an apparatus (not shown) for additive manufacturing of three-dimensional objects. A respective apparatus is provided for additive manufacturing of at least one object by successive, selective layer-by-layer exposure and thus solidification of individual construction material layers of a construction material (not shown) that can be solidified by means of at least one energy beam (not shown). The construction material that can be solidified can, for example, be a metal powder. A metal powder can also mean a powder mixture of different metals. Thus, it holds true for a metal powder that it can also be a powder of at least one metal alloy. The energy beam can be a laser beam. The apparatus can be an apparatus for performing selective laser melting methods (SLM methods in short) or selective laser sintering methods (SLS methods in short), i.e. a selective laser melting apparatus (SLM apparatus) or a selective laser sintering apparatus (SLS apparatus).

The powder module 1 can generally be any powder module, which is provided for receiving and/or dispensing construction material. In particular, the powder module 1 can be a construction module in which the actual additive construction of objects is performed and which, for this purpose, is filled with construction material to be solidified in a successive, selective layer-by-layer manner when performing additive manufacturing processes, a metering module via which, when performing additive manufacturing processes, construction material is metered out into a process chamber successively and in layers, or a collector module which, when performing additive manufacturing processes, is filled with construction material that is not solidified. In the exemplary embodiment shown in the Figures the powder module 1 is a construction module, wherein subsequent explanations are not limited to the design of the powder module 1 as construction module.

The powder module 1 comprises a powder chamber 3. The powder chamber 3 limits a powder room 4 that can be filled with construction material. By way of FIG. 1, 2 it can be seen that the powder room 4 is laterally limited by a powder chamber wall 5 of the powder chamber 3 generally formed as a hollow parallelepiped or hollow cylinder. At the bottom, the powder room 4 is limited by a carrying device 6. The carrying device 6 is a powder chamber table having stored thereon a powder chamber plate (not shown). The carrying device 6 is, as indicated by a double arrow P1, movably supported between two end positions, i.e. between an upper end position (related to the height of the powder module 1) and a lower end position shown in FIG. 1, relative to the powder chamber 3; the movable support of the carrying device 6 is realized by an especially (electro) motor operated drive or actuator device 7 coupled with the carrying device.

Between the powder chamber wall 5 limiting the powder room 4 and the carrying device 6 a gap 8 is formed extending (in vertical direction) at least partially along the powder chamber wall 5 limiting the powder room 4, especially surrounding the carrying device 6 in a ring-shaped circumferential manner. Through the gap 8, construction material from the powder room 4 can enter into a powder module section lying below the carrying device 6. The gap 8 represents a "leakage section" via which construction material from the powder room 4 can enter a powder module section lying below the carrying device 6 despite possible existing sealing elements (not shown).

The gap 8 opens out directly into a receiving section 9 of a receiving element 2 arranged below the powder chamber 3 and attached to the powder chamber 3 shown in the exemplary embodiment in the Figure by screw fastening; the gap 8 thus turns directly into the receiving section 9 of the receiving element 2 arranged below the powder chamber 3. Especially from FIG. 3, it can be seen that the receiving element 2 in the exemplary embodiment shown in the Figure can be formed by a frame-like receiving element structure (not denoted in more detail).

The receiving section 9 of the receiving element is formed as or comprises a circumferential ring-shaped, self-contained flow channel structure 10 provided for receiving construction material from the gap 8. In the flow channel structure 10 a closed flow fluid cycle can develop. The term "ring-shaped circumferential" in connection with the exemplary embodiment is to be understood to mean that the flow channel structure 10 is formed extending (significantly) along the dimensions of the carrying device 6. From the Figure it can be seen that the flow channel structure 10 is a groove channel-shaped recess in the receiving element 2 or the receiving section 9.

The flow channel structure 10 is, in terms of a preferably optimum ability to flow through, fluidically configured with a flow fluid, typically a gas, e.g. air. The structural design of the flow channel structure 10 is selected such that comparatively low flow capacities are required to realize the flow rates necessary for removing construction material from the receiving section 9. In particular, the structural design of the flow channel structure 10 enables the formation of a (widely) laminar flow.

To enter the flow fluid into the flow channel structure 10 the receiving element 2 comprises connecting elements 11 for connecting at least one flow generation device (not shown) which is provided for generating a fluid flow (cleaning flow) flowing through the flow channel structure 10 to remove construction material located in the flow channel structure 10 from the flow channel structure 10. In the exemplary embodiment shown in the Figures the connecting elements 11 are arranged or formed in the area of the receiving section 9. A first connecting element 11 can serve for feeding the flow fluid into the flow channel structure 10 and a second connecting element can serve for deducing the flow fluid loaded with construction material from the flow channel structure 10. The flow fluid can flow in the form of a suction flow or blower flow; accordingly the flow generation device can be a suction or a blower device.

To purposefully affect the ability to flow through or the flow properties of the flow channel structure 10, said structure can comprise flow-affecting elements (not shown). In the simplest case, a respective flow element can be formed by a purposeful change of the cross-section geometry of the flow channel structure 10. For example, by a purposeful change of the cross-section geometry an increase or a decrease of the flow rate of the flow fluid flowing through the flow channel structure 10 can be realized.

The flow channel structure 10 has a cross-section geometry that is open on one side, i.e. toward the top, and (significantly) U-type in the exemplary embodiment shown in the Figures. The aperture (opening aperture 12) of the flow channel structure 10 faces the powder room 4 limited by the powder chamber 3.

The powder module 1 comprises a guide element 13 partially limiting the gap 8. The guide element 13 is arranged or formed opposite the powder chamber wall 5 limiting the gap 8, and extends in parallel to said wall. The geometry of the guide element 13 is adjusted to the geometry of the powder chamber 3 such that the gap 8 is formed between the guide element 13 and the powder chamber wall 5.

The guide element 13 is movably supported between a closing position shown in FIG. 1 and an opening position shown in FIG. 2 and vice versa, relative to the flow channel structure 10 or the receiving element 2. In the closing position, the guide element 13, i.e. especially a closing portion 14 of the guide element 13 facing the opening aperture 12 of the flow channel structure, is moved relatively to the flow channel structure 10, i.e. especially toward the opening aperture 12 of the flow channel structure, such that an intrusion of construction material into the flow channel structure 10 is impossible. Therefore, in the closing position it is not possible for construction material from the gap 8 to enter the receiving section 9 of the receiving element, or the flow channel structure 10. In the open position, the guide element 13, i.e. especially the closing portion 14 facing the opening aperture 12 of the flow channel structure, is moved relatively to the flow channel structure 10, i.e. especially away from the opening aperture 12 of the flow channel structure, such that an intrusion of construction material into the flow channel structure 10 is possible. Therefore, in the open position it is possible for construction material from the gap 8 to enter the receiving section 9 of the receiving element, or the flow channel structure 10.

In the exemplary embodiment shown in the Figures the movable support of the guide element 13 is realized by a coupling for movement of the guide element 13 with the carrying device 6. The coupling for movement of the guide element 13 with the carrying device 6 is realized by integrally forming the guide element 13 and the carrying device 6. The guide element 13 forms a prism-like or cylindrical extension of the carrying device 6.

As mentioned, the carrying device 6 is movably supported between two end positions, i.e. between an upper end position (related to the height of the powder module 1) and a lower end position, relative to the powder chamber 3. From FIG. 1 it can be seen that the closing position of the guide element 13 corresponds to the lower end position (also shown in FIG. 1) of the carrying device 6. Consequently, the guide element 13 is moved into the closing position, if the carrying device 6 is moved into the lower end position.

The receiving element 2 or the receiving section 9 is in the area of a edge portion (not denoted in more detail) limiting the opening aperture 12 formed with a surface section 15 angularly inclined in the form of a bevel. The design of an edge portion provided with a surface section formed inclined is practical, as it ensures that no construction material can accumulate outside the flow channel structure 10 between the gap 8 and the flow channel structure 10. With the inclined design of the edge portion, the construction material is "forced" to enter into the flow channel structure 10 according to the principle of a funnel.

The guide element 13 in the section of a free end, i.e. in the section of the closing portion 14, is formed with a surface section (not denoted in more detail) formed diametrically opposed (inclined) to the surface section 15 of the edge portion of the receiving element 9. Thus, in the closing position of the guide element 13 an (improved) sealing of the flow channel structure 10 can be realized, which ensures an efficient flowing through the flow channel structure 10 by the flow fluid.

In order to reduce the size (inner span) of the opening aperture 12 of the flow channel structure, the powder module 1 in the exemplary embodiment shown in the Figures comprises a cover element 16 that can be or is attached (in the assembly state of the powder module 1) to the receiving element 9 and minimizes the opening aperture 12. The cover element 16 is—analogous to the edge portion of the receiving element limiting the opening aperture 12 of the flow channel structure—in the section of a edge portion (not denoted in more detail) limiting the opening aperture 12 formed with a surface section 17 angularly inclined in the form of a bevel. The design of the cover element 16 provided with a surface section 17 formed inclined is practical, as it also ensures that no construction material can accumulate outside the flow channel structure 10 between the gap 8 and the flow channel structure 10. With the inclined design of the edge portion, the construction material is "forced" to enter into the flow channel structure 10 according to the principle of a funnel.

The guide element 13 in the section of a free end, i.e. in the section of the closing portion 14, is additionally formed with a surface section formed diametrically opposed to the surface section 17 of the edge portion of the cover element 16. Thus, in the closing position of the guide element 13 a (further improved) sealing of the flow channel structure 10 can be realized, which ensures an efficient through-flow of the flow channel structure 10 by the flow fluid.

The invention claimed is:

1. A method for removing powdered construction material from an additive manufacturing powder module, the method comprising:
   receiving the powdered construction material in a powder room of a powder chamber;
   performing an additive manufacturing process in the powder room defined by at least one wall;

moving from a closing position to an opening position by separating a receiving element and a carrying device;

passing the powdered construction material through a gap defined by the at least one wall and the carrying device and into a receiving section comprising a flow channel; and removing the powdered construction material from the flow channel.

2. The method of claim 1, further comprising:

moving from the opening position to the closing position by moving the receiving element and the carrying device relatively towards each other prior to removing the powdered construction material from the flow channel.

3. The method of claim 1, wherein the carrying device comprises a guide element configured guide the powdered construction material into the flow channel.

4. The method of claim 3, wherein the guide element comprises an outer perimeter wall configured to define the gap between the at least one wall and the carrying device.

5. The method of claim 4, wherein the guide element further comprises a free end configured to seal with the receiving section in the closing position.

6. The method of claim 5, wherein the guide element is configured as part of the carrying device.

7. The method of claim 5, wherein the guide element is movably coupled with the carrying device.

8. The method of claim 7, wherein the guide element is integrally connected to the carrying device.

9. The method of claim 8, wherein the guide element is a prism-like or cylindrical extension of the carrying device.

10. The method of claim 3, further comprising moving the guide element to the closing position configured to prevent the powdered construction material passing into the flow channel.

11. The method of claim 3, wherein the closing position is defined by sealing contact of the guide element and the receiving element.

12. The method of claim 3, wherein a free end of the guide element is configured with an end surface section diametrically opposed to at least one surface section of the receiving section.

13. The method of claim 1, wherein the flow channel has a cross-sectional geometry open on one side.

14. The method of claim 1, wherein the flow channel is disposed below the gap.

15. The method of claim 14, wherein the flow channel is configured as a ring-shaped circumferential flow channel.

16. The method of claim 1, further comprising limiting an opening aperture of the flow channel with a cover element.

17. The method of claim 16, further comprising funneling the powdered construction material with at least one inclined or curved surface section of the cover element in a section of at least one edge portion defining the opening aperture.

18. The method of claim 1, further comprising generating, with a flow generation device, a fluid flow through the flow channel.

19. The method of claim 18, further comprising connecting the flow generation device to the receiving element with at least one connecting element.

* * * * *